May 22, 1962 A. BRODY 3,036,216
APPARATUS FOR RECORDING LENDING LIBRARY TRANSACTIONS
Filed Oct. 23, 1958 6 Sheets-Sheet 1

INVENTOR.
ARTHUR BRODY
BY Frederick Breitenfeld
ATTORNEY

May 22, 1962 A. BRODY 3,036,216
APPARATUS FOR RECORDING LENDING LIBRARY TRANSACTIONS
Filed Oct. 23, 1958 6 Sheets-Sheet 2

INVENTOR:
ARTHUR BRODY
BY
ATTORNEY

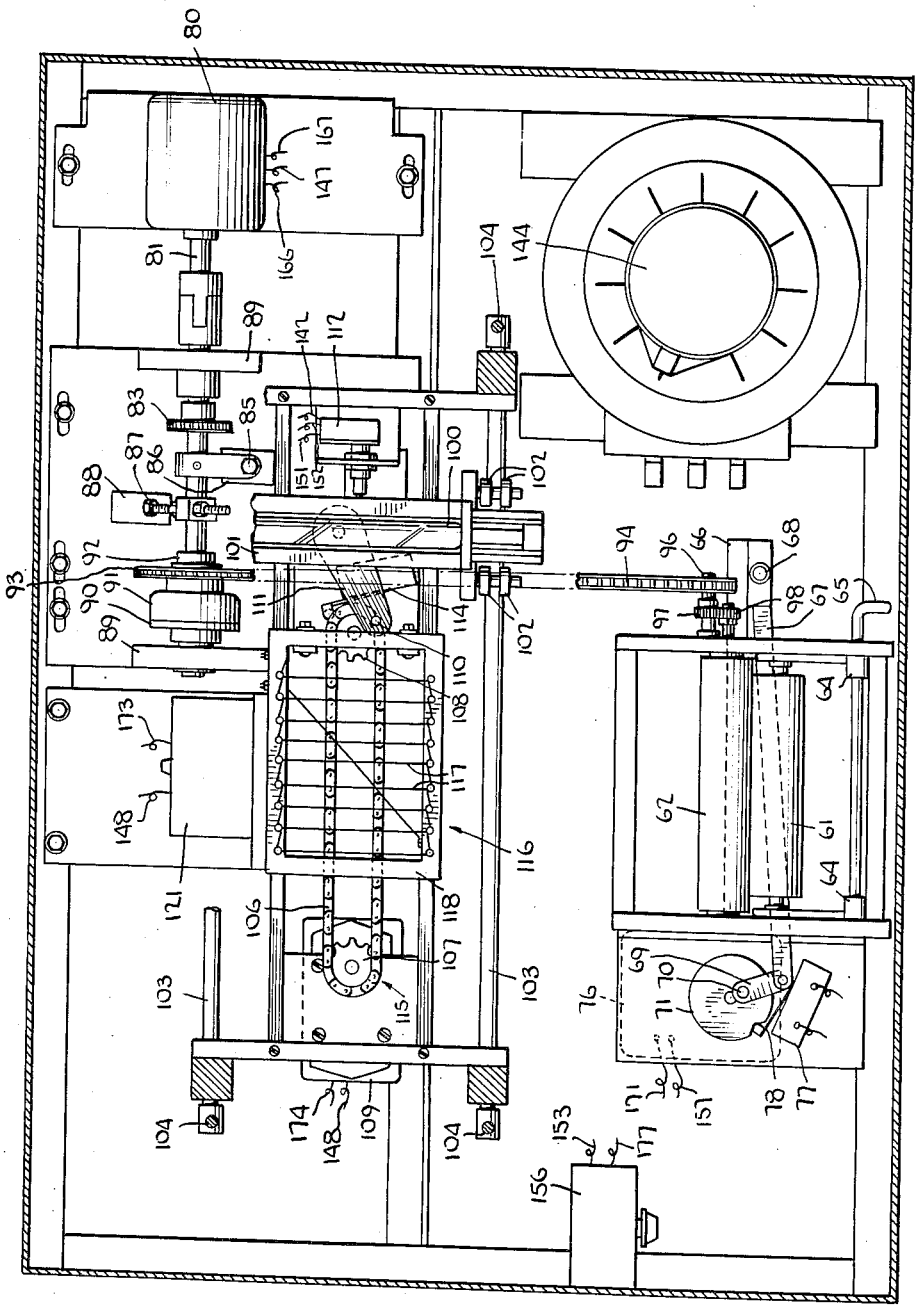

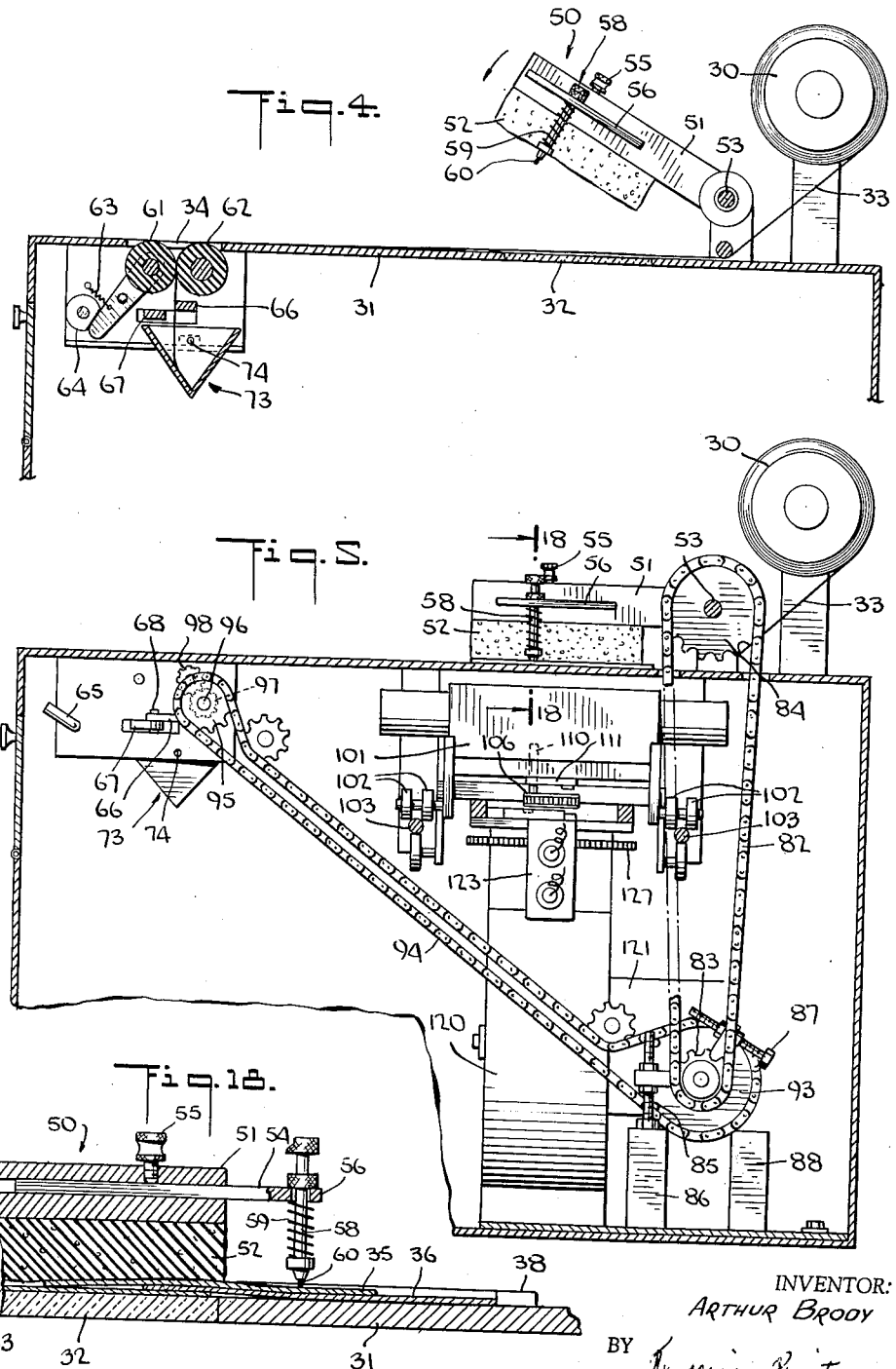

May 22, 1962 A. BRODY 3,036,216
APPARATUS FOR RECORDING LENDING LIBRARY TRANSACTIONS
Filed Oct. 23, 1958 6 Sheets-Sheet 5
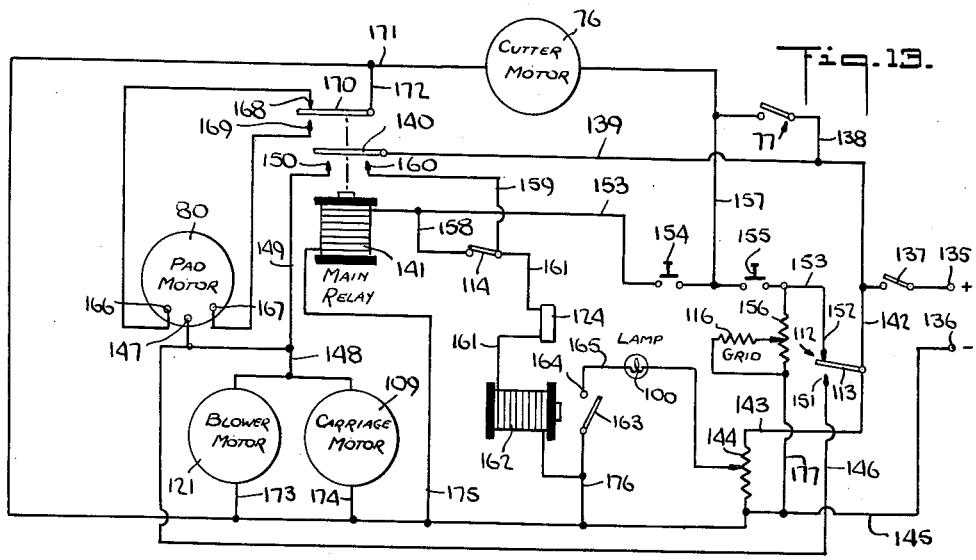
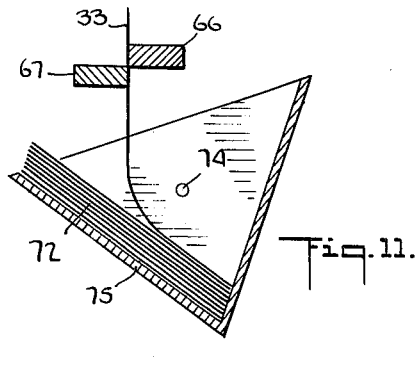
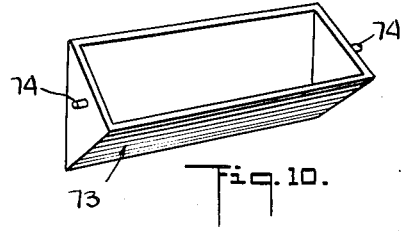
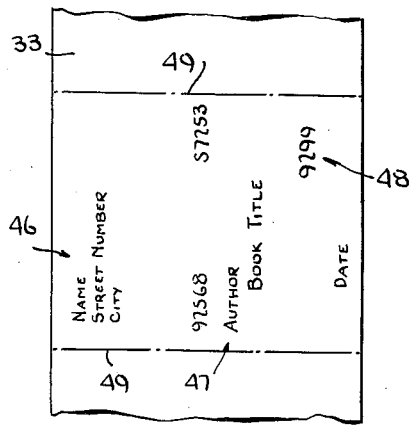
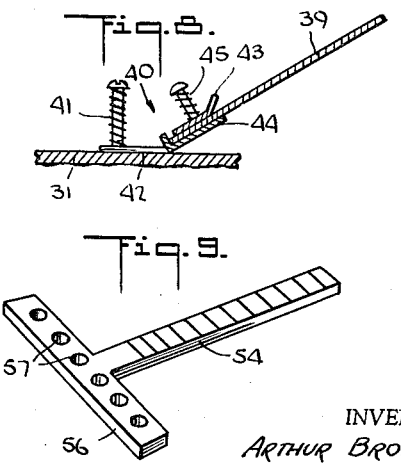
INVENTOR:
*ARTHUR BRODY*
BY *Frederick Breitenfeld*
ATTORNEY May 22, 1962 A. BRODY 3,036,216
APPARATUS FOR RECORDING LENDING LIBRARY TRANSACTIONS
Filed Oct. 23, 1958 6 Sheets-Sheet 6
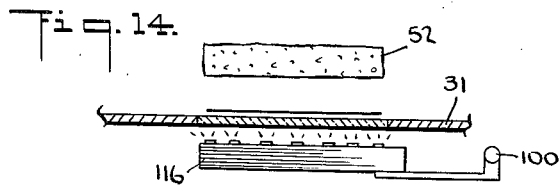
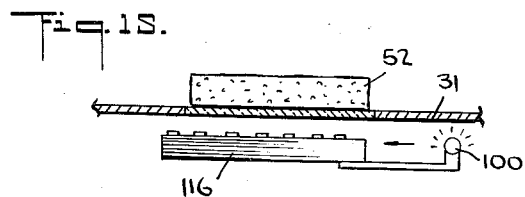
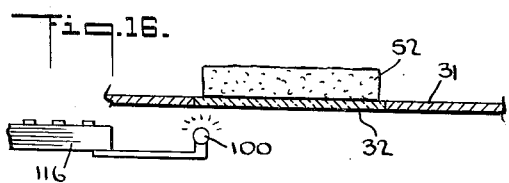
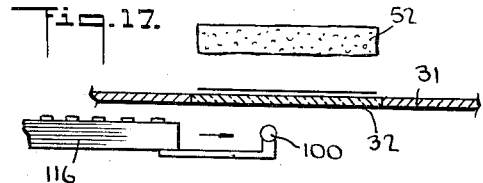
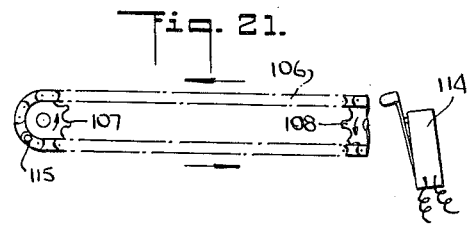
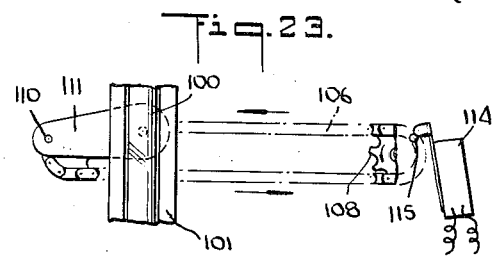
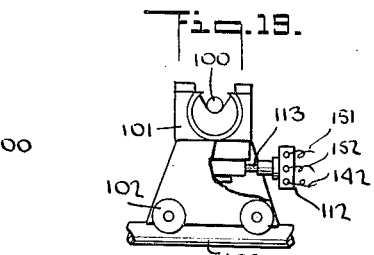
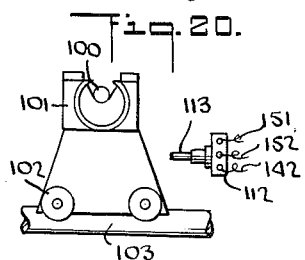
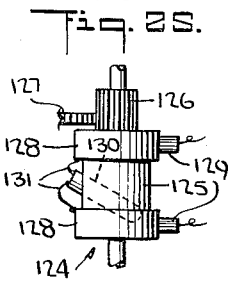
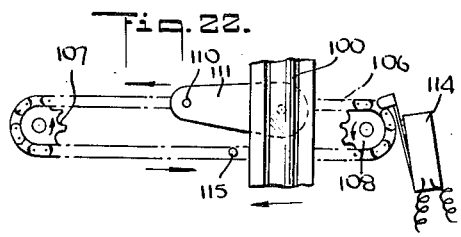
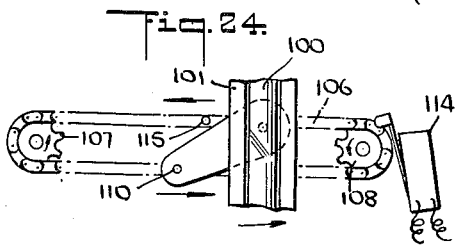
INVENTOR:
ARTHUR BRODY
BY Frederick Reitenfeld
ATTORNEY

United States Patent Office 3,036,216
Patented May 22, 1962

3,036,216
APPARATUS FOR RECORDING LENDING
LIBRARY TRANSACTIONS
Arthur Brody, 465 Melrose Place, South Orange, N.J.
Filed Oct. 23, 1958, Ser. No. 769,183
31 Claims. (Cl. 250—65)

This invention relates generally to library-book charging systems and has particular reference to improvements in apparatus commonly employed in libraries to record book-borrowing transactions.

It is a general object of the invention to provide an apparatus which is more reliable and efficient in its operation than devices heretofore proposed for the purpose.

The kind of apparatus to which the invention is specifically directed is a recorder which is set into operation each time a book is borrowed, to make a record of the borrower's name and the title of the book, along with such other relevant information as the library may desire. In one type of apparatus heretofore proposed for this purpose, the recording is achieved photographically. In another system, a printing operation by means of stencils is involved. These devices have proven in practice to have many shortcomings, and it is an object of the present invention to overcome them.

For example, in the system which works photographically, it is impossible to tell immediately whether the photographic part of the equipment is properly functioning, and this is obviously a great disadvantage since the failure of the mechanism to perform its function may not be discovered until a much later time, after a great many transactions have gone unrecorded. Moreover, the necessity periodically to send films for processing is undesirable, since the library is thereby yielding possession (and frequently suffers total loss) of important records. Another disadvantage lies in the difficulty of checking the records when it becomes necessary to locate delinquent borrowers, since a tedious and eye-straining examination of projected microfilm impressions is necessary. The recording system that involves the employment of stencils is a costly procedure, requiring the preparation of innumerable special stencil elements. Moreover, it involves relatively cumbersome mechanisms and operating techniques.

The present invention is predicated upon the employment of so-called "thermographic" paper, whereby the many known advantages of "heat printing" may be attained. As is well known, this system of making impressions involves merely the laying of an ordinary typewritten card onto a paper having suitable heat sensitivity, and heating the paper to cause a transfer to it of an impression of the typewritten matter. The improved apparatus of this invention is specially adapted to this kind of "printing," and embodies numerous novel features of structure and mode of operation, whereby most of the disadvantages of previously attempted systems are avoided, and many additional benefits are attained.

In order that the objective and advantages of the invention may be better understood, brief reference will be made to the procedures involved when a library regulates its book-borrowing operations by the so-called "transaction card" or "T-card" system commonly in use today. The library prepares a "book card" for each book, bearing the title, its class or index number, and similar information. Each patron of the library has a "borrower's card" on which there is the patron's name and address, possibly other relevant data. The library also has on hand a supply of simple slips or cards, known as "transaction cards" which are currently dated and sequentially numbered. Each time a book is borrowed, the library makes and retains a recorded impression of the relevant information on the book card, the borrower's card, and the next available transaction card. The borrower's card is then returned to the patron; and both the book card and the transaction card are placed in the book itself. As books are returned to the library, the transaction cards are removed from them and collected in numerical sequence. The system relies for its operation upon the circumstance that most books are diligently returned, and thus delinquencies become apparent by the failure of transaction cards to show up among those accumulated. Those missing are readily identifiable by number, and with this number as a guide, the library's recorded impressions may be consulted in any given case to find out who the delinquent is and what book is involved.

It is apparent from the foregoing that the information recorded by the charging apparatus is of paramount importance. One of the special features of the new apparatus is its ability to show immediately, as each record is made, whether the desired impression has been properly and legibly created. Any failure of the apparatus in this regard is detectable before the charging operation has been completed.

Another feature of the improved apparatus resides in the ability to make the impressions upon successive areas of a continuous length of paper, fed to printing position from a convenient supply roll, while nevertheless allowing the strip to be immediately and readily severed into separate pieces which can be accumulated in the form of a stack of separate recordings. This makes it a simple and fast procedure to locate any selected record, and obviates the necessity for tedious winding or re-winding of long stretches of recorded matter. Moreover, no special projectors or viewers are needed.

Another advantage of the invention stems from the ability to use the recording itself, of any delinquency transaction, as a self-sufficient information-bearing card from which an "overdue" reminder or other communication can be printed.

It is among the more particular objects of the invention to provide an apparatus having the foregoing purpose and capabilities, in which special means are provided for assuring a proper application of heat at all times. Among the novel features of the invention are a means for applying the heat uniformly across the printing area, a means for maintaining a minimum temperature bias on the printing area to avoid irregularities due to intervening periods of idleness, a means for cooling the printing region to prevent overheating, and a means for automatically disconnecting the heat entirely in case a malfunctioning of the apparatus threatens to create an overheated condition.

Another specific object of the invention is to provide an improved means, in an apparatus of the character described, to "spot" or otherwise mark the book card in a special manner, during each charging operation, to record the circumstance that the book had been selected by a borrower and to impart information as to the timing and duration of demand for that particular book.

Other objectives of the invention are to provide improved means for holding and controlling the borrower's card during the charging operation, to prevent overheating in case it is to be used for a series of successive charges (e.g., if several books are taken at one time); to provide an improved mechanism for advancing the supply of thermographic paper intermittently, and for cutting it and and accumulating the severed printed areas without curling or displacement; to provide a special carriage for a heating lamp or device, and a means for controlling its movement in a particular way to assure a functioning of the apparatus in proper fashion; and in general to provide an apparatus which is structurally simple and relatively inexpensive to manufacture, easy to operate, and reliable in fulfilling its functions in the contemplated manner over long periods of use.

A preferred way of achieving these general objects and advantages, and such others as may hereinafter be pointed out, is illustrated in the accompanying drawings, in which—

FIG. 3 is a plan view of some of the mechanism, as viewed along the line 3—3 of FIG. 2;

FIG. 4 is a fragmentary cross-sectional view substantially along the line 4—4 of FIG. 2;

FIG. 5 is a fragmentary cross-sectional view substantially along the line 5—5 of FIG. 2;

FIG. 8 is an enlarged view of a detail showing the holder for the borrower's card;

FIG. 9 is a perspective view of part of the special "spotting" mechanism;

FIG. 10 is a perspective view of part of the record accumulating mechanism;

FIG. 11 is an enlarged fragmentary view of part of the accumulating mechanism shown in FIG. 10;

FIG. 12 is a fragmentary view of the thermographic strip, showing a typical recording of a book-borrowing transaction thereon;

FIG. 13 is a schematic representation of the electric circuits controlling the operation of the apparatus;

FIGS. 14–17 are diagrammatic representations of the timing of the action of the main heater and the subordinate heater;

FIG. 18 is a fragmentary cross-sectional view along the line 18—18 of FIG. 5;

FIGS. 19 and 20 are explanatory views showing the relation between the carriage and the electric switch it controls;

FIGS. 21–24 are explanatory views to illustrate the relation between the carriage-moving chain and the switch controlled by it; and FIG. 25 is an elevational view of the centrifugally actuated switch forming part of the mechanism.

In the apparatus illustrated, a supply roll 30 of heat-printable paper is supported above the rear part of a work table 31. This table forms the top wall of a housing or structure within which the mechanisms of the apparatus are supported. The various brackets and supports may be of any suitable character, and since the details are, in general, immaterial to an understanding of the invention, many of them have been omitted for the sake of simplicity of illustration.

Figure 1:
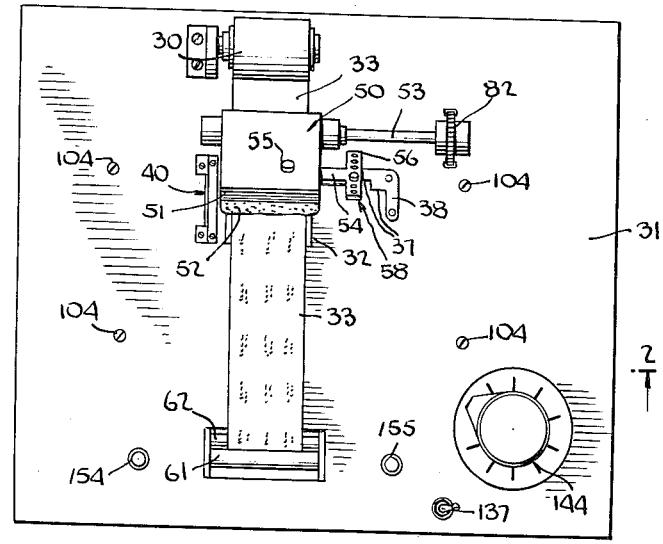
FIG. 1 is a plan view of an apparatus of the present character.

The work table 31 is provided with a heat-transparent window 32, preferably substantially rectangular in shape. The paper strip 33, which may be of any appropriate width, usually about 2 inches, is guided by suitable rollers or other means across the table and over the window 32. The strip 33 travels forwardly for an appreciable distance beyond the window area (see FIG. 1) and then passes downwardly through a slot 34 to a cutter and a collecting station.

The strip 33 is advanced intermittently, in timed relation to the operation of the other elements of the device, and the extent of each advance is just sufficient to bring successive areas of the paper into an overlying relation to the window 32. This is the recording position. To effect the desired recording, library cards are positioned and held face down in a predetermined manner against the paper area overlying the window, and a heating means beneath the window is operable to direct the heat upwardly through the window in a controlled manner.

Figure 6:
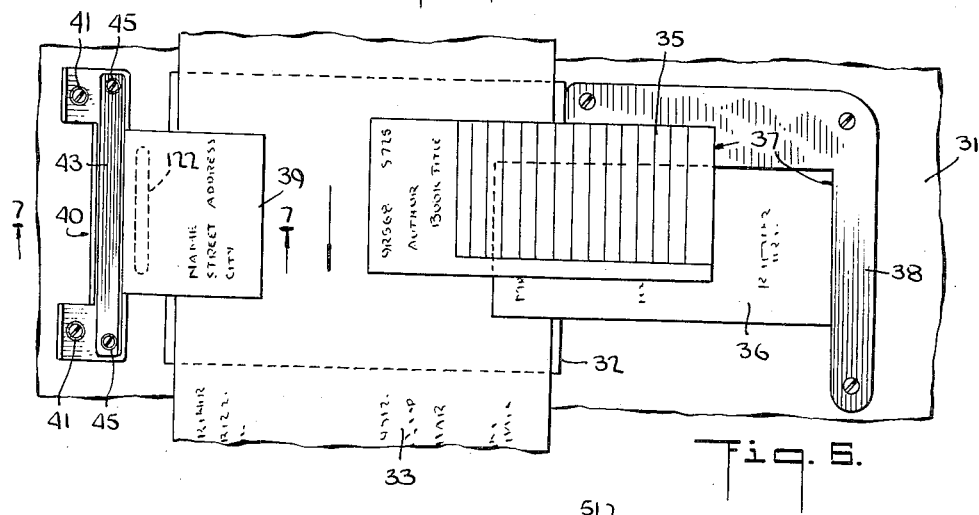
FIG. 6 is an enlarged fragmentary view of the printing area, looking down upon it as in FIG. 1.

The library cards may be of any usual kind, bearing their significant notations in typewritten or printed form. The book card 35 and the transaction card 36 (FIG. 6) may be properly located by fitting them into the angular recesses 37 especially provided for this purpose in a fitting 38 secured to the top of the table 31. The patron's card 39 is preferably engaged by a special holder 40 which is spring-biased to maintain the card away from direct contact with the table top, for a purpose hereinafter to be described.

Figure 7:
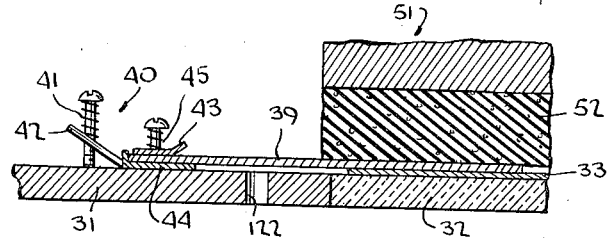
FIG. 7 is a fragmentary cross-sectional view substantially along the line 7—7 of FIG. 6, with the clamping arm down.

The holder 40 (see FIGS. 7 and 8) is of shallow V-shaped cross-section, mounted on the table for pivotal movement about the apex of the V. A spring or springs 41 constantly urges the arm 42 of the holder toward the position of FIG. 8, in which it lies flat against the table 31, adjacent to an edge of the window 32. The other arm of the holder comprises two card-engaging jaws 43, 44 pressed together by springs 45. These jaws tend to hold the engaged card 39 at an inclination to the table top, as shown in FIG. 8, but they may be moved downwardly against the action of the spring or springs 41.

The recording operation creates the desired series of impressions on the area of heat-printable paper at the recording position, as indicated in FIG. 12. Thus, the impression 46 shown in this figure, is produced by the imprinted information on the patron's card 39, the impression 47 stems from the information imprinted on the book card 35, and the marking 48 is made by the transaction card 36. This marked area on the strip 33 (lying between the lines 49 of FIG. 12) is ultimately severed from the strip, and accumulated in a convenient stack along with similar recordings of other transactions.

Before the marked area is cut off, it moves to a visible position directly forwardly of the window area (FIG. 1) and in this way the librarian may see the recording that has been made, to make sure that the markings are present and legible, before the patron is allowed to leave with the borrowed book or books.

The holding down of the library cards is achieved by a pressure pad 50, comprising a cover-like unit pivotally mounted on the table to permit swinging movement between the inclined raised position shown in FIG. 4 and the operative down position indicated in FIG. 5. The unit 50 may be composed of a rigid backing element 51 and a relatively soft and yieldable pad 52 of sponge rubber or plastic. The part 51 may be mounted on a shaft 53 suitably supported in bearings and adapted to be swung back and forth through an arc to impart the desired movements to the pressure pad.

The unit 50 carries a special marking device which is operative during each descent of the pressure pad to apply a spot or similar mark to the rear face of the underlying book card 35. These marks are for the purpose of accumulating information on the card as to the extent and timing of the use of that particular book. To accomplish this object the marking device is operable in an adjustable way to permit the selective application of the marks to different regions of the card. The device shown in FIG. 9 is usable in this way. It is a T-shaped element, the stem 54 being longitudinally adjustable in a slot formed in the part 51 of the presser pad unit. By means of markings on the stem 54, it may be adjusted longitudinally into any desired setting, projecting sideways from the presser unit. A set screw 55 holds it in place. The stem 56 is provided with a row of recesses 57, each of which is adapted to receive and engage a marking instrument such as that shown at 58. The instrument 58 may include a spring 59 arranged to allow the instrument to recede yieldably whenever the marking point 60 encounters card 35 during the descent of the unit 50. It is to be noted that the array of holes 57 is at right angles to the direction of adjustability of the stem 56.

As the paper 33 with its recordings thereon passes downwardly through the slot 34 in the table 31, it travels between a pair of rollers 61, 62 (FIG. 4). The roller 62 is a drive roller and the roller 61 is merely an idler. The idler is urged against the roller 62 by the spring 63 and may be swung away, to facilitate threading of the paper 33, by means of the cam 64 actuated by handle 65 (FIGS. 3 and 5).

The rollers 61 and 62 feed the strip 33 downwardly between a pair of shearing elements. The blade 66 of the cutter is fixed in position (FIGS. 3–5) and the other blade 67 is pivoted at 68 and is moved back and forth by a link 69 (FIG. 3) pivoted to a crank pin 70 on the wheel 71. During each shearing operation one area is severed from the end of the strip 33 and falls into place on top of an accumulating stack 72 in a special receptacle 73 (FIGS. 10–11).

At periodic intervals the recordings in the receptacle 73 are removed. They are of course in the same sequentially numbered relation as the transaction slips successively used during the recording operations.

The receptacle 73 has a V-shaped cross section, and is suspended on pivots 74 for free-swinging movement. It is so located beneath the cutter blades that the approaching end of the paper strip encounters the inclined wall 75 of the receptacle (or the stack 72 already lying in it) in a tangential or sliding manner as indicate in FIG. 11. The parts are so arranged that the cut piece of paper does not fall through any appreciable distance when it is cut. The desired relationship is automatically maintained, since the minute added weight of each cut piece tips the receptacle slightly so that the accumulating stack 72 does not interfere with the reception of additional pieces. Moreover, the cut pieces lie flat in a neat stacked condition, and there is no tendency or opportunity for them to curl or shift or bunch together in a disorderly manner. This is an important feature of the new apparatus, since heat-printable paper is light in weight and curls readily.

The cutter is operated by its own electric motor 76 (see FIG. 3) preferably located directly beneath the wheel 71. The electric circuit (hereinafter to be described in greater detail) includes a micro-switch 77 whose movable part 78 fits into a recess or depression in the rim of the wheel 71 when the parts are at rest, with the shearing elements 66, 67 in separated relation as indicated in FIG. 3. The switch 77 is in a locking circuit which keeps the motor 76 operating whenever the switch is closed. As the wheel 71 starts to rotate, it forces the switch element 78 out of its recess and closes the switch 77. The motor then continues to rotate the wheel 71 through one complete revolution, and when the switch element 78 snaps back into the recess in the edge of the wheel 71 the switch 77 reopens and breaks the motor-driving circuit. In this way each cutting operation is a single shearing action. As will be pointed out hereinafter, this action occurs automatically and in a predetermined timed relation to the other activities of the apparatus.

The actuation of the pressure pad 50 and the intermittent paper advancement stems from a single source. A reversible electric motor 80 drives a shaft 81 (FIGS. 2 and 5), which may be supported in bearings 89. A chain 82 extends from a sprocket 83 on this shaft to a sprocket 84 on the shaft 53 of the pressure pad unit 50. The shaft 81 carries an arm on which there is an adjustable stop 85 adapted to encounter the abutment 86 when the shaft rotates in one direction; and carries also another arm on which there is an adjustable stop 87 adapted to encounter the abutment 88 when the shaft rotates in the opposite direction. The motor 80 is of the capacitor type which may be stalled without impairment. The control circuit is such that when the motor is actuated (in carrying out a recording operation) the motor turns first in one direction to bring the pressure pad 50 down, then at a predetermined time interval in the opposite direction to restore the pressure pad to its normal raised position. The downward movement of the pad is limited by the abutment of the stop 85 against the part 86, and the upward movement is similarly stopped when the parts 87, 88 encounter each other.

Figure 2:
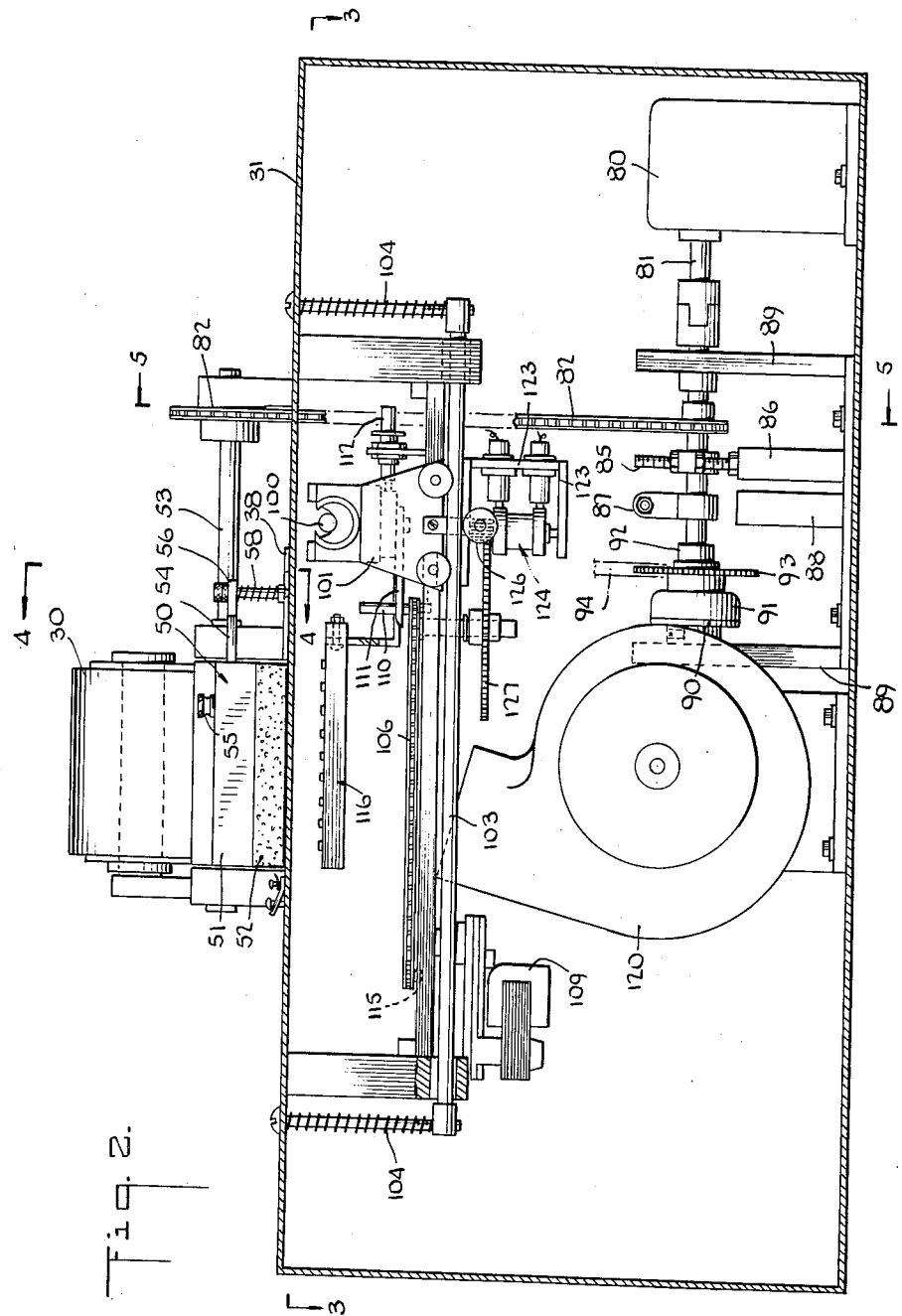
FIG. 2 is an enlarged cross-sectional elevational view, substantially along the line 2—2 of FIG. 1.

The shaft 81 is also secured by an appropriate key or set screw to one part 90 of a one-way clutch (see FIGS. 2 and 3). The other part 91 of the clutch is on a sleeve 92 rotatable on but otherwise disconnected from the shaft 81. From a sprocket 93 on the sleeve 92 a chain 94 leads to a sprocket 95 on a jack-shaft 96 parallel to and adjacent to the pull-roller 62. Meshing gears 97, 98 transmit the driving force of the chain 94 to the roller 62.

Because of the action of the one-way clutch on the shaft 81, motion is imparted to the chain 94 in only one direction. The parts are so associated that the chain 94 is moved only during the return swing of the shaft 81, i.e., during the lifting movement of the pressure pad unit 50. Thus, it is during this lifting movement, after each recording operation has been completed, that the paper strip 33 is advanced forwardly by a selected increment.

The application of heat to the paper 33 in properly controlled amounts and in a uniform fashion is brought about by a heater, preferably in the form of an elongated lamp 100 mounted on a carriage 101 which moves back and forth beneath the window 32 in a direction at right angles to the axis of the lamp. The carriage is provided with wheels 102 which ride along rails 103. These rails are supported in an adjustable manner from the table 31 by means of threaded rods 104. Turning movements imparted to the slotted heads 104 (see FIG. 1) by a screwdriver or other appropriate tool make it possible to adjust the height and alignment of the rails 103 with accuracy. This allows the heating lamp 100 to be properly focused, i.e., to bring it to the correct distance beneath the table 31 so that the heat emanating from it and reflected upwardly by the reflector beneath it may be concentrated in the form of a line at exactly the proper level to effect the desired recording to maximum advantage.

The carriage 101 is shown in FIG. 2 in its normal rest position. When the cycle of recording operations is initiated, it moves to the left as seen in this figure, to sweep the heater across the window area, and then it returns to its starting point. The electric control circuit is such that the lamp 100 is inactive at all times except during the advancing lap of movement of the carriage.

The carriage 101 is propelled by a chain 106 extending around a pair of spaced sprockets 107 and 108. The sprocket 107 is driven by the motor 109 mounted beneath it. As viewed in FIG. 3 and FIGS. 21–24, the chain moves in a counter-clockwise direction. Carried by it is the upstanding pin 110 which extends pivotally through the front end of the link 111 pivotally secured at its rear end to the under side of the carriage 101.

The parts are so arranged that during the advance movement of the carriage (i.e., toward the left) the line between the two pivoted ends of the link 111 is directly aligned with the pulling lap of the chain (see FIGS. 21–24). This imparts a minimum of vibration to the carriage during the active part of the lamp travel.

For a purpose to be explained more fully in connection with the electric circuit arrangements, a double-throw micro-switch 112 is so positioned adjacent to the rest position of the carriage 101 (see FIGS. 19–20) that whenever the carriage 101 is "home" it engages the movable part 113 of this switch and holds it in one of its two positions. The switch has a spring bias which immediately and automatically throws the part 113 into the opposite setting (FIG. 20) whenever the carriage moves away from its rest position.

Another structural feature affecting the electric circuit operations is the provision of a normally closed microswitch 114 adjacent to the chain 106 (see FIGS. 21–24), and a pin or projection 115 on the chain 106 adapted to encounter the movable part of the switch 114 to open the switch at the conclusion of a half-cycle of movement of the chain. The switch 114 is in a holding circuit which maintains a control relay in operation, and when the switch 114 is opened by the pin 115 the main relay becomes inactivated. The effect of this will be described more fully hereinafter.

An important feature of the apparatus resides in the provision of the subordinate heating coil 116. This heater preferably takes the form of a grid which is substantially rectangular and approximately the size of the window 32. This grid may consist of heating wires 117 stretched back and forth across a rigid supporting frame 118. By means of an appropriate bracket the frame 118 is rigidly secured to and moves with the carriage 101.

The parts are so arranged that when the carriage 101 is at its "home" posititon (FIGS. 2, 3, 14 and 19) the grid 116 lies directly beneath the window 32; and the electrical circuit is such that the grid is continuously activated when it is at rest, but is immediately and automatically inactivated while the carriage is moving.

This cycle of operation is best shown in FIGS. 14–17, wherein it will be noted that the grid 116 is active and the heater 100 inactive in the normal rest position (FIG. 14); the grid becomes inactive and the heater 100 is energized as soon as the carriage starts to move (FIG. 15); the heater 100 becomes inactive at the conclusion of its advance (FIGS. 16, 17); and the grid 116 remains inactive throughout the entire cycle of carriage movement (FIGS. 15, 16, 17).

The purpose of the grid 116 is to maintain a predetermined temperature at the window 32 during inactive periods of use of the apparatus. This temperature is sufficiently low to be ineffective upon the heat-printable paper, but unless a minimum "temperature bias" of this kind is maintained, a single sweep of the heating lamp 100 across the window area might be insufficient to effect the desired recording action if the apparatus has been standing idle and has cooled off.

As a safeguard against the injurious effects of an over-accumulation of heat in the window area during particularly active periods of use, it is desirable to provide a blower 120. The blower is actuated by a motor 121 which operates concurrently with the carriage-moving motor. The blower is situated to blow air upwardly against the window 32.

A slot 122 is formed in the table 31 directly adjacent to the card-holding arm of the device 40 (see FIGS. 6 and 7) so that cooling air will be directed upwardly through the table 31 against the patron's card 39 as the latter assumes the raised position of FIG. 8. This makes it possible to make a series of successive book-charging recordings with the same patron's card (in the common case of a borrower withdrawing a plurality of books at one time) without building up an undesirable and possibly injurious heat within the card itself.

A further safeguard is provided against excessive heat concentration in the event that a malfunctioning of mechanism may cause the carriage to come to a halt during its advance movement, with the heater activated. Mounted beneath the carriage 101 is a supporting frame 123 within which a centrifugally actuated switch 124 is journaled. This switch is shown in FIG. 25. It consists essentially of a cylindrical body 125 mounted with its axis vertical and rotatable on this axis in the supporting frame 123. Carried by the spindle of the body 125 is a pinion 126 which is in constant mesh with the much larger gear 127 mounted on the shaft of the chain sprocket 108. The contacts of the switch are mutually insulated conductive slip rings 128 at opposite ends of the body 125, and brushes 129 which engage with these rings. Carried by the body 125 is a chamber 130 within which there is a quantity of mercury. Extending into the chamber 130 in insulated relation are a pair of contacts 131 connected respectively to the slip rings 128. While the body 125 is at rest, the mercury in the chamber 130 is inactive and the switch remains open. Upon rotation of the body 125 (which occurs only when the carriage 101 is moving) the mercury is flung centrifugally outward in the chamber 130, and establishes an electrical connection between the contacts 131, thus closing the switch.

The motors and other electrical parts of the apparatus are electrically connected and cooperatively inter-related as indicated in the circuit diagram of FIG. 13. A main source of power is connected to the input terminals 135, 136 and a main switch 137 is provided. A wire 138 connects the terminal 135 to one of the contacts of the cutter micro-switch 77, and a wire 139 connects it also to the part 140 of the armature of the main relay 141. The terminal 135 is also connected by wire 142 to the movable part 113 of the double-throw carriage micro-switch 112, and a wire 143 connects it also to a resistor 144 by means of which the intensity of the heater lamp 100 may be regulated. A wire 145 leads back from the resistor 144 to the input termial 136.

One terminal 151 of the carriage micro-switch 112 is connected by a wire 146 to the center or common terminal 147 of the reversible motor 80. From the wire 146 a branch 148 leads to the carriage and blower motors 109 and 121, and a branch 149 leads to a contact 150 engageable by the relay armature part 140 when the relay 141 is energized.

The other terminal 152 of the carriage micro-switch 112 is connected by a wire 153 to the energizing coil of the relay 141, and in this line are two hand-operated starter buttons 154, 155.

Leading from the wire 153 on the "live" side of the starter buttons is a resistor 156 by means of which the intensity of the grid 116 may be controlled.

Leading from the wire 153 at a point between the starter buttons is a wire 157 which connects with the cutter motor 76 and also with the fixed contact of the cutter micro-switch 77.

Also leading from the wire 153 at a point beyond both starter buttons is a wire 158 extending to one of the contacts of the chain-actuated micro-switch 114. The other contact of this switch leads by a wire 159 to a contact 160 engageable by the relay armature part 140 when the relay 141 is energized; and by a wire 161 to a relay 162 which controls the heater 100. In the line 161 is the centrifugal switch 124.

The armature 163 of the lamp relay 162 carries a contact which engages with a fixed contact 164 when the relay is energized. The lamp 100 is in the line 165 extending from the contact 164 to the lamp-controlling resistor 144.

The reversing terminals 166 and 167 of the motor 80 are connected respectively to a pair of opposed contacts 168, 169 between which the part 170 of the main relay armature moves. This armature part is normally in contact with one of them and moves into contact with the other when the relay is actuated.

Return connections to the input terminal 136 extend from the cutter motor 76 at 171; from the armature part 170 at 172; from the blower motor 121 at 173; from the carriage motor 109 at 174; from the main relay coil 141 at 175; from the lamp relay coil 162 and the armature 163 at 176; and from the grid resistor 156 at 177.

The cycle of operations is as follows:

Under normal inoperative conditions the carriage is in position of FIG. 2, and the pressure pad is raised. None of the electrically heated devices, nor any of the relays, is activated. When the main switch 137 is closed, a connection is established via lines 142, 113, 152, 153, 177 and 145 to activate the resistor 156 and the grid 116. The latter thereupon assumes its low temperature heating function. The resistor 144 also has current flowing through it but with the relay 162 open, the main heater 100 remains inactive.

When a book-charging record is to be made, the librarian places the required cards in their proper places at the recording position and presses both starter buttons 154, 155 simultaneously. They are preferably set at positions which require the operator to use both hands, for reasons of safety.

Pressure on the buttons 154, 155 energizes and locks in the main relay 141, and starts the cutter motor.

The cutter motor is started via circuit 142, 113, 152, 153, 155, 157, 76 and 171. The operation of the microswitch 77 "locks in" this circuit, and the cutter motor will therefore automatically come to a stop after one complete cycle of movement of the cutter elements.

The main relay 141 is "locked in" by momentary pressure on the starter buttons 154, 155, via the circuit defined by the wires and parts designated 139, 140, 160, 159, 114, 141, 175 and 145.

The closing of the main relay 141 also brings about the following operations:

(1) The carriage and blower motors are started, via wire 139, armature 140, contact 150, and connections 149, 148.

(2) The lamp relay 162 is energized, via connections 139, 160, 159, 161, 124 (the carriage is moving), 162, and 176, thereby actuating armature 163 to close the main heater circuit through parts 143, 100, 165, 164, 163 and 176.

(3) The movement of the carriage from its rest position throws switch element 113 from terminal 152 to terminal 151. This has numerous additional effects.

(4) The carriage motor 109 and the blower motor 121 become "locked in" until the carriage 101 has completed its entire back-and-forth movement.

(5) The circuit to the grid 116 via terminal 152 is broken, thereby de-activating the grid.

(6) The pressure pad motor 80 is started, the circuit being completed through connections 151, 146, 147, 167, 169, 170 (drawn down by relay 141) and 172.

As the carriage 101 completes its advancing sweep across the window area, during which time (perhaps 3 or 4 seconds) the heater lamp 100 has activated the heat-sensitive paper at the window and thereby made the desired recording, the micro-switch 114 is momentarily actuated to open its contacts. This breaks the locking-in circuit of the main relay 141, as a result of which the armature parts 140 and 170 are released. The breaking of the circuit at contact 160 de-energizes the lamp relay 162, releases the armature 163, and extinguishes the lamp 100. The breaking of the circuit at contact 150 has no effect on the carriage and blower motors since these have been "locked-in" as previously described. The breaking of the circuit at 169 is accompanied by a making of contact at 168, whereby the pressure pad motor 80 reverses its movement.

All the parts and instruments are restored to their original state when the carriage finally returns to its "home" position and shifts the switch element 113 back to its normal engagement with the terminal 152.

It will be apparent from the foregoing that the apparatus is easy to operate, provided with automatic safety devices to guard the operator as well as the apparatus itself and the library cards and paper, and reliable in fulfilling its function. The user can observe at all times whether the recording is properly taking place. The operation of the apparatus is low in cost and requires no specially prepared stencils or other accessories, and at no time is it necessary for the library to relinquish records that should properly be maintained in its possession. Moreover, the apparatus is relatively small and compact, and there is no light-obstructing and unattractive superstructure of the kind which is required when a photographic camera is employed for the recording purpose.

It will be understood that many of the features of the new apparatus may have applicability to recording apparatus generally, and that many of the structural and electrical details herein described and illustrated may be modified in various ways without necessarily departing from the spirit and scope of the invention as expressed in the appended claims.

What is claimed is:

1. In an apparatus for recording lending library transactions, a supply roll of thermographic paper, a work table having a heat transmitting window, means for intermittently advancing the paper from said supply roll across said table so as to bring successive areas into a recording position overlying said window, said advancing means maintaining said paper in stationary condition with respect to said window during the recording operation, means for holding a plurality of library cards down against the paper area at the recording position, said cards being at all times free of engagement with said paper advancing means, a carriage beneath said table, an upwardly radiant heater on said carriage, means for moving the carriage back and forth to sweep said heater across the window area to effect the recording operation, and means operatively connecting together said paper-advancing means, card-holding means, carriage-moving means and heater for actuation in timed relation with one another.

2. In an apparatus for recording lending library transactions, a work table having a heat transmitting window, means for advancing thermographic paper into a stationary recording position overlying said window, means for holding a plurality of library cards down against the paper area at the recording position, said cards being at all times free of engagement with said paper advancing means, a carriage beneath said table and normally at rest but movable to advance from and return to its rest position, an upwardly radiant electric heater on said carriage, said heater being so positioned on the carriage that it sweeps across the window area during the movements of the carriage and means operatively connecting together said paper-advancing means, card-holding means, and carriage for actuation in timed relation with one another.

3. In a recording apparatus, the combination with the elements defined in claim 2, of a normally inactive electric circuit for said heater, and means operable in response to carriage movement for activating said cricuit.

4. In a recording apparatus, the combination with the elements defined in claim 2, of a normally inactive electric circuit for said heater, means operable in response to one part of the carriage movement for activating said circuit, and means operable in response to another part of the carriage movement for restoring said circuit to its normal inactivity.

5. In a recording apparatus, the combination with the elements defined in claim 2, of a normally inactive electric circuit for said heater, and means operable in response to movement of said carriage away from its rest position for activating said circuit.

6. In a recording apparatus, the combination with the elements defined in claim 2, of a normally inactive electric circuit for said heater, means operable in response to movement of said carriage away from its rest position for activating said circuit, and means operable at the completion of the advancing movement of the carriage for restoring said circuit to its normal inactivity.

7. In an apparatus for recording lending library transactions, a supply roll of thermographic paper, a work table having a heat transmitting window, means for intermittently advancing the paper from said supply roll across said table so as to bring successive areas into a recording position overlying said window, means for holding a plurality of library cards down against the paper area at the recording position, a carriage beneath said table and normally at rest but movable to advance from and return to its rest position, an upwardly radiant electric heater on said carriage and so positioned that it sweeps across the window area during the movements of the carriage, a secondary electric heater adapted to impart a distributed heat to the window area insufficient to effect thermographic printing, a normally active electric circuit for said secondary heater, and means operable in response to carriage movement for inactivating said circuit when the carriage leaves its rest position and reactivating it when the carriage returns.

8. In an apparatus for recording lending library transactions, a supply roll of thermographic paper, a work table having a heat transmitting window, means for intermittently advancing the paper from said supply roll across said table so as to bring successive areas into a recording position overlying said window, means for holding a plurality of library cards down against the paper area at the recording position, a carriage beneath said table and normally at rest but movable to advance from and return to its rest position, an upwardly radiant electric heater on said carriage and so positioned that it sweeps across the window area during the movements of the carriage, a normally inactive electric circuit for said heater, a secondary electric heater adapted to impart a distributed heat to the window area insufficient to effect thermographic printing, a normally active electric circuit for said secondary heater, and means operable in response to carriage movement for activating said first-named circuit and inactivating the circuit of said secondary heater.

9. In an apparatus for recording lending library transactions, a supply roll of thermographic paper, a work table having a heat transmitting window, means for intermittently advancing the paper from said supply roll across said table so as to bring successive areas into a recording position overlying said window, means for holding a plurality of library cards down against the paper area at the recording position, a carriage beneath said table and normally at rest but movable to advance from and return to its rest position, an upwardly radiant electric heater on said carriage and so positioned that it sweeps across the window area during the movements of the carriage, a normally inactive electric circuit for said heater, a secondary electric heater adapted to impart a distributed heat to the window area insufficient to effect thermographic printing, a normally active electric circuit for said secondary heater, and means operable in response to movement of said carriage away from its rest position for activating said first-named circuit and simultaneously inactivating the circuit of said secondary heater.

10. In a recording apparatus, the elements defined in claim 7, said secondary heater being also mounted on said carriage.

11. In a recording apparatus, the elements defined in claim 7, said secondary heater being also mounted on said carriage and comprising a heating grid substantially coextensive with the window area and so positioned on the carriage that it lies directly below said window when the carriage is in its rest position.

12. In an apparatus for recording lending library transactions, a supply roll of thermographic paper, a work table having a heat transmitting window, means for intermittently advancing the paper from said supply roll across said table so as to bring successive areas into a recording position overlying said window, a pressure pad movable downwardly toward and upwardly away from said window for holding a plurality of library cards down against the paper at the recording position, a carriage beneath said table, an upwardly radiant heater on said carriage, means for moving the carriage back and forth to sweep said heater across the window area, and means for moving said pressure pad in timed relation to said carriage movements.

13. In an apparatus for recording lending library transactions, a supply roll of thermographic paper, a work table having a heat transmitting window, means for intermittently advancing the paper from said supply roll across said table so as to bring successive areas into a recording position overlying said window, a pressure pad movable downwardly toward and upwardly away from said window for holding a plurality of library cards down against the paper at the recording position, a carriage beneath said table, an upwardly radiant heater on said carriage, means for moving the carriage back and forth to sweep said heater across the window area, means for moving said pressure pad, an electric circuit for moving the pressure pad down and also initiating a back-and-forth movement of the carriage, and means operable in response to a predetermined carriage movement for lifting the pressure pad prior to a completion of the carriage movement cycle.

14. In an apparatus for recording lending library transactions, a supply roll of thermographic paper, a work table having a heat transmitting window, means for intermittently advancing the paper from said supply roll across said table so as to bring successive areas into a recording position overlying said window, a pressure pad movable downwardly toward and upwardly away from said window for holding a plurality of library cards down against the paper at the recording position, a carriage beneath said table, an upwardly radiant electric heater on said carriage, said carriage being normally at rest but movable to advance from and return to its rest position, said heater being so mounted on said carriage that it sweeps across the window area during movements of the carriage, means for moving said carriage, means for moving said pressure pad, a normally inactive electric circuit for said heater, an electric circuit for simultaneously initiating a cycle of carriage movement and a descent of said pressure pad, means operable in response to carriage movement away from its rest position for activating said heater circuit, and means operable upon a completion of the advancing movement of the carriage for inactivating said heater circuit and lifting said pressure pad.

15. In an apparatus for recording lending library transactions, a supply roll of thermographic paper, a work table having a heat transmitting window, means for intermittently advancing the paper from said supply roll across said table so as to bring successive areas into a recording position overlying said window, means for holding a plurality of library cards down against the paper area at the recording position, a carriage beneath said table, an upwardly radiant heater on said carriage, said heater being electrically activatable, means for moving the carriage back and forth to sweep said heater across the window area, and means responsive to a cessation of carriage movement for instantly inactivating said heater.

16. In an apparatus for recording lending library transactions, a supply roll of thermographic paper, a work table having a heat transmitting window, means for intermittently advancing the paper from said supply roll across said table so as to bring successive areas into a recording position overlying said window, means for holding a plurality of library cards down against the paper area at the recording position, a carriage beneath said table, an upwardly radiant heater on said carriage, said heater being electrically activatable, an electric circuit therefor, means for moving the carriage back and forth to sweep said heater across the window area, a centrifugal make-and-break switch in said heater circuit, said switch comprising a rotatable member and means for maintaining the switch in one setting when said member rotates and in the other setting when the rotation stops, and driving means interposed between the carriage moving means and said rotatable switch member whereby said heater becomes instantly inactivated upon cessation of carriage movement.

17. In an apparatus for recording lending library transactions, a supply roll of thermographic paper, a work table having a heat transmitting window, a cutter located beneath said table at an appreciable horizontal distance from said window, said table having a slot above said cutter through which said paper is directed downwardly toward said cutter, means for intermittently advancing the paper from said supply roll across said window to said cutter whereby successive areas of the paper are brought into a recording position overlying said window, means for holding a plurality of library cards down against the paper area at the recording position, heating means beneath the table and operable through said window to make the desired recordings on successive paper areas, said recordings being visible for inspection on the table area between said window and said slot, and means operable in timed relation to the paper advancing means for actuating said cutter so as to cut off said record-bearing areas in succession.

18. In a recording apparatus, the combination with the elements defined in claim 17, of a receptacle beneath the cutter for receiving the cut-off areas, said cutter delivering said areas in a vertical plane and said receptacle being provided with an inclined wall so positioned that the advancing edge of each cut-off area impinges against it in a sliding relation.

19. In a recording apparatus, the combination with the elements defined in claim 17, of a receptacle beneath the cutter for receiving the cut-off areas, said cutter delivering said areas in a vertical plane and said receptacle being provided with an inclined wall so positioned that the advancing edge of each cut-off area impinges against it in a sliding relation, said receptacle having a V-shaped cross-section and said inclined wall being one arm of the V, said receptacle being pivotally suspended for movement about a horizontal axis, whereby incoming cut-off areas are guided toward the apex of the receptacle in stacked relation.

20. In an apparatus for recording lending library transactions, a supply roll of thermographic paper, a work table having a heat transmitting window, means for intermittently advancing the paper from said supply roll across said table so as to bring successive areas into a recording position overlying said window, heating means beneath the table and operable through said window, means for holding a plurality of library cards down against the paper area at the recording position, said holding means comprising a pressure pad movable downwardly toward and upwardly away from said window, and a marking device carried by said pressure pad for applying a mark to the upper surface of one of said library cards.

21. In a recording apparatus, the elements defined in claim 20, said marking device being adjustably mounted on said pressure pad so that the location of said mark on said card may be varied.

22. In a recording apparatus, the elements defined in claim 20, said marking device comprising an arm adjustably mounted on said pressure pad and provided with a plurality of holders each of which is adapted to support a marking instrument, said holders being arranged in a row at an angle to the direction of adjustment of said arm.

23. In a recording apparatus, the elements defined in claim 20, said marking device being adjustably mounted on said pressure pad so that the location of said mark on said card may be varied, said marking device comprising a T-shaped arm whose stem is longitudinally movable with respect to said pressure pad, the cross-bar being provided with an array of holders each of which is adapted to support a marking instrument.

24. In an apparatus for recording lending library transactions, a supply roll of thermographic paper, a work table having a heat transmitting window, means for intermittently advancing the paper from said supply roll across said table so as to bring successive areas into a recording position overlying said window, heating means beneath the table and operable through said window, means for holding a plurality of library cards down against the paper area at the recording position, and spring-biased means for engaging at least one of said cards to maintain it away from said window except when said holding means is operative.

25. In an apparatus for recording lending library transactions, a supply roll of thermographic paper, a work table having a heat transmitting window, means for intermittently advancing the paper from said supply roll across said table so as to bring successive areas into a recording position overlying said window, heating means beneath the table and operable through said window, means for holding a plurality of library cards down against the paper area at the recording position, said holding means comprising a pressure pad movable downwardly toward and upwardly away from said window, and spring-biased means for engaging at least one of said cards to maintain it normally out of contact with said window but in the path of movement of said pressure pad.

26. In a recording apparatus, the elements defined in claim 25, said spring-biased means comprising a clamp having card-engaging jaws and pivoted to said table adjacent to the recording position.

27. In a recording apparatus, the elements defined in claim 25, said spring-biased means comprising a clamp having card-engaging jaws and pivoted to said table adjacent to the recording position, and a spring yieldably urging said jaws into a position in which the engaged card inclines upwardly from the pivot axis.

28. In an apparatus for recording lending library transactions, a supply roll of thermographic paper, a work table having a heat transmitting window, means for intermittently advancing the paper from said supply roll across said table so as to bring successive areas into a recording position overlying said window, heating means beneath the table and operable through said window, an electric circuit controlling the operation of said heating means and including a means for inactivating said heating means after a predetermined time, and a blower beneath the table adapted to direct cooling air upwardly against said window, said blower being controlled by said circuit for activation and inactivation in timed relation to said heating means.

29. In an apparatus for recording lending library transactions, a supply roll of thermographic paper, a work table having a heat transmitting window, means for intermittently advancing the paper from said supply roll across said table so as to bring successive areas into a recording position overlying said window, means for holding a plurality of library cards down against the paper area at the recording position, a carriage beneath said table, an upwardly radiant heater on said carriage, means for moving the carriage back and forth to sweep said heater across the window area, a blower beneath the table for directing cooling air upwardly against said window, and electric control means for activating said blower only during movements of the carriage.

30. In an apparatus for recording lending library transactions wherein information from a plurality of separate library cards is to be transferred simultaneously on to a single record, a work table having a recording station, said station including a heat transmitting window in said work table and holding means normally spaced above said window and movable downwardly against said window, a radiant heater below said table and normally out of registry with said window, means for sweeping said heater back and forth below said window to complete a cycle of operation, a continuous web of thermographic paper disposed upon the upper surface of said work table and lying between said window and said holding means, means for intermittently advancing said web longitudinally prior to each cycle of operation so as to present a fresh non-exposed area of said web to said recording station, and means for thereafter moving said holding means downwardly after the plurality of library cards have been placed upon said web at said recording station in order to press the fresh area of said web and the cards against said window, said holding means remaining effective during said cycle of operation whereby the information on said cards is recorded on the fresh area of said web, said recording being visible upon the next operation of said web advancing means.

31. In an apparatus for recording lending library transactions, the combination with the elements defined in claim 30 of a cutter spaced along said web from said window a distance greater than the length of one of said fresh areas, and means for actuating said cutter once during each cycle of operation in order to sever one of said exposed fresh areas from said web thereby producing an individual record of a lending library transaction.

References Cited in the file of this patent

UNITED STATES PATENTS

| | | |
|---|---|---|
| 2,511,892 | Wise | June 20, 1950 |
| 2,697,649 | Roth | Dec. 21, 1954 |
| 2,740,895 | Miller | Apr. 3, 1956 |
| 2,787,190 | McWhirter et al. | Apr. 2, 1957 |
| 2,831,979 | Kallenberg | Apr. 22, 1958 |
| 2,891,165 | Kuhrmeyer et al. | June 16, 1959 |
| 2,903,546 | O'Mara | Sept. 8, 1959 |
| 2,927,210 | O'Mara | Mar. 1, 1960 |